US009963662B2

(12) United States Patent
Athneil

(10) Patent No.: US 9,963,662 B2
(45) Date of Patent: May 8, 2018

(54) CLEANING COMPOSITION AND METHOD FOR PROCESSING EQUIPMENT

(71) Applicant: Seacole-CRC, LLC, Plymouth, MN (US)

(72) Inventor: Benjamin K. Athneil, Eagan, MN (US)

(73) Assignee: Seacole-CRC, LLC, Plymouth, MN (US)

( * ) Notice: Subject to any disclaimer, the term of this patent is extended or adjusted under 35 U.S.C. 154(b) by 0 days. days.

(21) Appl. No.: 15/139,521

(22) Filed: Apr. 27, 2016

(65) Prior Publication Data

US 2016/0312159 A1 Oct. 27, 2016

Related U.S. Application Data

(60) Provisional application No. 62/153,363, filed on Apr. 27, 2015.

(51) Int. Cl.

| | |
|---|---|
| ***C09K 13/02*** | (2006.01) |
| ***B08B 9/00*** | (2006.01) |
| ***C11D 7/26*** | (2006.01) |
| ***C11D 7/06*** | (2006.01) |
| ***C11D 11/00*** | (2006.01) |

(52) U.S. Cl.

CPC ................ *C11D 7/265* (2013.01); *C11D 7/06* (2013.01); *C11D 11/0041* (2013.01)

(58) Field of Classification Search

CPC ........ C11D 11/0041; C11D 7/06; C11D 7/265
USPC .... 134/22.1, 22.16, 22.17, 22.18, 22.19, 24, 134/34; 252/79.1, 79.2, 79.5; 216/83, 216/106
See application file for complete search history.

(56) References Cited

U.S. PATENT DOCUMENTS 2,817,606 A * 12/1957 Barrett ..................... A23C 7/02 134/22.17
5,378,346 A * 1/1995 Ashiru ..................... C25D 3/60 205/244
5,652,127 A * 7/1997 Mitchinson ............. C08B 30/12 435/201
6,017,863 A 1/2000 Cala et al.
6,551,972 B1 4/2003 Lei et al.
6,855,679 B2 2/2005 Renfrow
7,056,874 B2 6/2006 Tadrowski et al.
7,459,005 B2 12/2008 Lovetro et al.
7,838,484 B2 11/2010 Underwood et al.
7,939,482 B2 5/2011 Farkas
7,964,544 B2 6/2011 Smith et al.
8,802,613 B2 8/2014 Bonislawski et al.
8,877,697 B2 11/2014 Tanaka et al.
8,901,061 B2 12/2014 D'Ambrogio et al.
8,911,562 B2 12/2014 Gonzalez
2002/0136780 A1* 9/2002 Batarseh .................. A01N 3/02 424/618
2003/0155409 A1* 8/2003 Dockus ................ B23K 35/002 228/245
2008/0121250 A1* 5/2008 Fernholz ................. A01J 7/022 134/3
2011/0257057 A1* 10/2011 Huang ..................... C11D 7/08 510/269
2013/0122324 A1* 5/2013 Cao ......................... C23C 18/32 428/637
2014/0151235 A1* 6/2014 Mertens ................. C25D 11/26 205/50

FOREIGN PATENT DOCUMENTS

WO WO 2016081439 A1 * 5/2016 ............... A23L 2/02

OTHER PUBLICATIONS

Seacole. Dissolvene MS-40 Dry Film Soldermask Stripper. Technical Data Sheet, 2 pages, 2008.
Seacole. Material Safety Data Sheet: Dissolvene MS-40. Jan. 25, 2013, 4 pages.

* cited by examiner

*Primary Examiner* — Nadine Norton
*Assistant Examiner* — Christopher Remavege
(74) *Attorney, Agent, or Firm* — Faegre Baker Daniels LLP

(57) ABSTRACT

An aqueous cleaning solution composition includes about 8.7 wt. % to about 10.7 wt. % sodium hydroxide and about 0.7 wt. % to about 1.1 wt. % of potassium sodium tartrate.

13 Claims, No Drawings

CLEANING COMPOSITION AND METHOD FOR PROCESSING EQUIPMENT

CROSS-REFERENCE TO RELATED APPLICATION

This application claims priority to Provisional Application No. 62/153,363, filed Apr. 27, 2015, which is herein incorporated by reference in its entirety.

TECHNICAL FIELD

The present invention relates to a cleaning composition and method of use. More specifically, the invention relates to a cleaning composition and method of use for industrial processing equipment.

BACKGROUND

Industrial processing of starches obtained from a variety of sources, including crops, such as corn, rice, and cassava is becoming more commonplace, particularly in the production of biofuels, such as ethanol. The industrial processing of starches, or processes that may form starches, may suffer from a deposition of process residues on processing equipment surfaces. Heated solutions of concentrated sodium hydroxide solutions are typically used to clean such residues by, for example, a batch cleaning process or a clean-in-place (CIP) process.

In some cases, the process residues formed include starches which may be difficult to remove. Ethanol production from, for example, corn or cellulose, is particularly susceptible to the build-up of starch residues, especially within fermentation vessels. The starch residues formed within ethanol fermentation tanks have proven to be resistant to removal by a heated concentrated sodium hydroxide solution. What is needed is a cleaning solution that is effective against a starch residue coating on process equipment surfaces such as, for example, ethanol fermentation tanks.

SUMMARY

Various embodiments concern an aqueous cleaning solution composition. The aqueous cleaning solution composition may include about 8.7 wt. % to about 10.5 wt. % sodium hydroxide and about 0.7 wt. % to about 1.1 wt. % of potassium sodium tartrate. In some embodiments, the sodium hydroxide may be present in an amount of about 9.2 wt. % to about 10.0 wt. % and the potassium sodium tartrate may be present in an amount of about 0.8 wt. % to about 1.0 wt. %. In still further embodiments, the sodium hydroxide may be present in an amount of about 9.6 wt. % and the potassium sodium tartrate may be present in an amount of about 0.9 wt. %.

Various embodiments concern methods for removing residues including starches and metal ions complexed to the starches from a processing equipment surface. Such methods can include providing an aqueous cleaning solution composition; maintaining the aqueous cleaning solution composition at a temperature; bringing the aqueous cleaning solution composition into contact with the processing equipment surface for a time sufficient to remove residues including starches, and metal ions complexed to the starches, from the surface; and removing the aqueous cleaning solution composition including the removed residues from the processing equipment. The aqueous cleaning solution composition provided may include sodium hydroxide and potassium sodium tartrate. The temperature may be maintained at about 88° C. (190° F.) to about 97° C. (207° F.). In some methods, the aqueous cleaning solution composition provided may include about 1.5 wt. % to about 10.5 wt. % sodium hydroxide and about 0.1 wt. % to about 1.1 wt. % of potassium sodium tartrate. In some methods, the aqueous cleaning solution composition provided may include about 1.6 wt. % to about 10.0 wt. % sodium hydroxide and about 0.2 wt. % to about 1.0 wt. % of potassium sodium tartrate. In other methods, the aqueous cleaning solution composition provided may include about 1.7 wt. % to about 9.6 wt. % sodium hydroxide and about 0.2 wt. % to about 0.9 wt. % of potassium sodium tartrate. In such methods providing the aqueous cleaning solution composition may include formulating an aqueous cleaning concentrate composition including about 25 wt. % to about 29.5 wt. % sodium hydroxide and about 2.3 wt. % to about 2.9 wt. % of potassium sodium tartrate, and then adding about 5 vol. % to about 30 vol. % of the formulated aqueous cleaning concentrate composition to about 70 vol. % to about 95 vol. % of water to provide the aqueous cleaning solution composition.

In such methods, bringing the aqueous cleaning solution composition into contact with the surface of the processing equipment may include circulating the aqueous cleaning solution composition over the surface. In other methods, the aqueous cleaning solution composition may be maintained at a temperature of about 97° C. (207° F.).

Various embodiments concern an aqueous cleaning concentrate composition. The aqueous cleaning concentrate composition may include about 25 wt. % to about 29.5 wt. % of sodium hydroxide and about 2.3 wt. % to about 2.9 wt. % of potassium sodium tartrate. In some embodiments, the sodium hydroxide may be present in an amount of about 26 wt. % to about 28 wt. % and the potassium sodium tartrate may be present in an amount of about 2.5 wt. % to about 2.7 wt. %. In other embodiments, the sodium hydroxide may be present in an amount of about 27 wt. % and the potassium sodium tartrate may be present in an amount of about 2.6 wt. %.

While multiple embodiments are disclosed, still other embodiments of the present invention will become apparent to those skilled in the art from the following detailed description, which describes exemplary embodiments of the invention. Accordingly, the detailed description is to be regarded as illustrative in nature and not restrictive.

DETAILED DESCRIPTION

Embodiments of a cleaning solution composition include sodium hydroxide and potassium sodium tartrate in aqueous solution. Such embodiments are effective in removing process residues, including starch residues, from industrial processing equipment. Examples of such industrial processing equipment include for example, ethanol fermentation tanks. Surprisingly, it was found that a relatively small amount of potassium sodium tartrate in combination with sodium hydroxide produced a cleaning solution composition that removes the starch residues from ethanol fermentation tanks faster than sodium hydroxide alone. Embodiments of the aqueous cleaning solution composition are also surprisingly effective at a lower concentration of sodium hydroxide than may be necessary in the use of other sodium hydroxide-based cleaning solutions. The improved removal rates of the starch residue may result in cost savings resulting from a reduction in process equipment downtime for cleaning. A reduction in the amount of sodium hydroxide required for the cleaning process may produce additional cost savings.

Without being bound by any theory or mechanism, it is believed that the process residues are formed by the incomplete breakdown of starches to sugars as, for example, in an ethanol fermentation tank. The residual starches collect on the process equipment surfaces. It is also believed that metal ions, such as calcium ions or magnesium ions, form a complex with the starch as it collects on the process equipment surfaces. Sodium hydroxide is normally able to break down starches. However, the presence of the complexed metal ions interferes with the ability of sodium hydroxide to break down the starch residue. Embodiments of the aqueous cleaning solution composition described herein are able to remove the metal ions from the residual starches by a chelating action of the potassium sodium tartrate. The chelating action also ties up the metal ions and prevents them from recomplexing with the residual starches. Once the metal ions are removed and tied up, the sodium hydroxide is able to break down the residual starches. In this way, it is believed that embodiments of the aqueous cleaning solution composition are able to remove the starch residues from ethanol fermenters faster, and at a lower sodium hydroxide concentration, than concentrated sodium hydroxide solutions alone.

The performance improvement provided by aqueous cleaning solution composition embodiments is particularly strong in instances where the concentration of metal ions complexed to the residual starches is relatively high. This may be the case, for example, in instances when the water employed in the ethanol fermentation tank during processing of the starches to sugar has a high concentration of dissolved minerals. Use of such "hard water" may be common in areas where water is supplied by a well and the minerals are not removed prior to use in the fermentation process.

Prior art compositions including sodium hydroxide and potassium sodium tartrate, such as Dissolvene MS-40™ available from Seacole-CRC, LLC, have been employed to clean cured dry film soldermasks from printed circuit boards. However, in addition to potassium sodium tartrate concentrations of 2-3 wt. %, such compositions require high sodium hydroxide concentrations on the order of at least 30 wt. %, and more typically 50 wt. %, to effectively remove the epoxy-based soldermask films.

An aqueous cleaning solution composition embodiment may include sodium hydroxide and potassium sodium tartrate. The sodium hydroxide may be present in an amount as little as about 1.5, about 1.6, or about 1.7 wt. %, or as great as about 9.6, about 10.0 or about 10.5 wt. %, or may be present within any range defined between any pair of the foregoing values. The potassium sodium tartrate may be present in an amount as little as about 0.1 or about 0.2 wt. %, or as great as about 0.9, about 1.0 or about 1.1 wt. % or may be present within any range defined between any pair of the foregoing values. In exemplary embodiments, the sodium hydroxide may be present from about 1.5 to about 10.5 wt. %, from about 1.6 to about 10.0 wt. %, or from about 1.7 to about 9.6 wt. %. In exemplary embodiments, the potassium sodium tartrate may be present from about 0.1 to about 1.1 wt. %, from about 0.2 to about 1.0 wt. %, or from about 0.2 to about 0.9 wt. %. All weight percentages (wt. %) in reference to the aqueous cleaning solution composition are based on the total weight of the aqueous cleaning solution composition, unless otherwise stated.

In some embodiments, in which the starch residues to be removed are particularly thick, or a faster removal rate may be desired, the sodium hydroxide may be present in an amount as little as about 8.7, or about 9.2 wt. % or as great as about 9.6, about 10.0 or about 10.5 wt. %, or may be present within any range defined between any pair of the foregoing values. The potassium sodium tartrate may be present in an amount as little as about 0.7 or about 0.8 wt. %, or as great as about 0.9, about 1.0, or about 1.1 wt. % or may be present within any range defined between any pair of the foregoing values. In exemplary embodiments, the sodium hydroxide may be present from about 8.7 to about 10.5 wt. %, from about 9.2 to about 10.0 wt. %, or about 9.6 wt. %. In exemplary embodiments, the potassium sodium tartrate may be present from about 0.7 to about 1.1 wt. %, from about 0.8 to about 1.0 wt. %, or about 0.9 wt. %.

Embodiments of the present invention may also include a method for removing residues including starches, and metal ions complexed to starches, from a processing equipment surface. The method includes providing an aqueous cleaning solution composition; maintaining the aqueous cleaning solution at a temperature; bringing the aqueous cleaning solution composition into contact with the process equipment surface for a time sufficient to remove residues including starches, and metal ions complexed to the starches, from the surface; and removing the aqueous cleaning solution composition and removed residues from the processing equipment. The aqueous cleaning solution composition provided may be as described above for any of the preceding embodiments. The temperature may be about 88° C. (190° F.) to about 97° C. (207° F.).

In some embodiments, the aqueous cleaning solution composition may be maintained at a temperature of about 97° C. (207° F.). In some embodiments, the aqueous cleaning solution composition may be maintained at the temperature before the cleaning solution composition is brought into contact with the processing equipment surface. In other embodiments, the aqueous cleaning solution composition may be maintained at the temperature by contact with the processing equipment surface.

In some embodiments, bringing the aqueous cleaning solution composition into contact with the process equipment surface may include circulating the cleaning solution composition over the surface either as in a clean-in-place system or circulation through a batch reactor.

Embodiments of the present invention may include an aqueous cleaning solution composition for use undiluted, or as-is, in removing starch residues. Embodiments may also include an aqueous cleaning concentrate composition to which water may be added to provide the cleaning solution composition for use in removing starch residues from processing equipment.

The aqueous cleaning solution compositions may be provided by diluting an aqueous cleaning concentrate composition. Such aqueous cleaning concentrate compositions may be as described for any of the embodiments below. Thus, the aqueous cleaning solution composition embodiments described above may be provided by adding about 5 vol. % to about 30 vol. % of the aqueous cleaning concentrate compositions formulated as described below to about 70 vol. % to about 95 vol. % of water. Alternatively, the aqueous cleaning solution composition embodiments described above may be provided by formulating them directly.

An aqueous cleaning concentrate composition embodiment may be formulated to include sodium hydroxide and potassium sodium tartrate. The sodium hydroxide may be present in an amount as little as about 25 or about 26 wt. % or as great as about 28, about 29, or 29.5 wt. %, or may be present within any range defined between any pair of the foregoing values. The potassium sodium tartrate may be present in an amount as little as about 2.3 or about 2.5 wt. % or as great as about 2.6, about 2.7, or about 2.9 wt. % or may be present within any range defined between any pair of the foregoing values. In exemplary embodiments, the sodium hydroxide may be present from about 25 to 29.5 wt. %, from about 26 to about 28 wt. %, or about 27 wt. %. In exemplary embodiments, the potassium sodium tartrate may be present from about 2.3 to about 2.9 wt. %, from about 2.5 to about 2.7 wt. %, or about 2.6 wt. %. All weight percentages (wt. %) in reference to the aqueous cleaning concentrate composition are based on the total weight of the aqueous cleaning concentrate composition, unless otherwise stated.

Embodiments described above employ sodium hydroxide as a strong base in combination with potassium sodium tartrate as a chelating agent to remove starch residues from industrial processing equipment. However, it is understood that other strong bases may be employed in combination with potassium sodium tartrate to remove starch residues, the other bases employed at molar concentrations comparable to the sodium hydroxide embodiments described above. Such strong bases may include, for example, potassium hydroxide.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The invention claimed is:

1. An aqueous cleaning solution composition comprising:

about 8.7 wt. % to about 10.5 wt. % sodium hydroxide; and about 0.7 wt. % to about 1.1 wt. % potassium sodium tartrate.

2. The aqueous cleaning solution composition of claim 1, wherein the sodium hydroxide is present in an amount of about 9.2 wt. % to about 10.0 wt. %, and the potassium sodium tartrate is present in an amount of about 0.8 wt. % to about 1.0 wt. %.

3. The aqueous cleaning solution composition of claim 2, wherein the sodium hydroxide is present in an amount of about 9.6 wt. %, and the potassium sodium tartrate is present in an amount of about 0.9 wt. %.

4. A method for removing residues including starches, and metal ions complexed to the starches, from a processing equipment surface, the method comprising:

providing an aqueous cleaning solution composition including sodium hydroxide and potassium sodium tartrate;

maintaining the cleaning solution composition at a temperature of about 88° C. (190° F.) to about 97° C. (207° F.);

bringing the cleaning solution composition into contact with the processing equipment surface for a time sufficient to remove residues including starches, and metal ions complexed to the starches, from the surface; and removing the cleaning solution composition including the removed residues from the processing equipment.

5. The method of claim 4, wherein the aqueous cleaning solution composition provided includes:

about 1.5 wt. % to about 10.5 wt. % of the sodium hydroxide; and about 0.1 wt. % to about 1.1 wt. % of the potassium sodium tartrate.

6. The method of claim 5, wherein the aqueous cleaning solution composition provided includes:

about 1.6 wt. % to about 10.0 wt. % of the sodium hydroxide, and about 0.2 wt. % to about 1.0 wt. % of the potassium sodium tartrate.

7. The method of claim 6, wherein the aqueous cleaning solution composition provided includes:

about 1.7 wt. % to about 9.6 wt. % of the sodium hydroxide, and about 0.2 wt. % to about 0.9 wt. % of the potassium sodium tartrate.

8. The method of claim 4, wherein providing the aqueous cleaning solution composition includes:

formulating a cleaning concentrate composition including about 25 wt. % to 29.5 wt. % of the sodium hydroxide, and about 2.3 wt. % to about 2.9 wt. % of the potassium sodium tartrate; and adding about 5 vol. % to about 30 vol. % of the cleaning concentrate composition to about 70 vol. % to about 95 vol. % of water to provide the cleaning solution composition.

9. The method of claim 4, wherein bringing the aqueous cleaning solution composition into contact with the surface of the processing equipment includes circulating the cleaning solution composition over the surface.

10. The method of claim 4, wherein the aqueous cleaning solution composition is maintained at a temperature of about 97° C. (207° F.).

11. An aqueous cleaning concentrate composition comprising:

about 25 wt. % to 29.5 wt. % sodium hydroxide; and about 2.3 wt. % to about 2.9 wt. % potassium sodium tartrate.

12. The aqueous cleaning concentrate composition of claim 10, wherein the sodium hydroxide is present in an amount of about 26 wt. % to about 28 wt. %, and the potassium sodium tartrate is present in an amount of about 2.5 wt. % to about 2.7 wt. %.

13. The aqueous cleaning concentrate composition of claim 11, wherein the sodium hydroxide is present in an amount of about 27 wt. %, and the potassium sodium tartrate is present in an amount of about 2.6 wt. %.

* * * * *